(12) United States Patent
Mao et al.

(10) Patent No.: US 10,335,828 B2
(45) Date of Patent: Jul. 2, 2019

(54) VIBRATION MOTOR

(71) Applicants: Lubin Mao, Shenzhen (CN); Fei Hou, Shenzhen (CN); Hongxing Wang, Shenzhen (CN)

(72) Inventors: Lubin Mao, Shenzhen (CN); Fei Hou, Shenzhen (CN); Hongxing Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 339 days.

(21) Appl. No.: 15/294,985

(22) Filed: Oct. 17, 2016

(65) Prior Publication Data

US 2017/0120299 A1  May 4, 2017

(30) Foreign Application Priority Data

Nov. 3, 2015 (CN) .................... 2015 2 0870213 U

(51) Int. Cl.
| | |
|---|---|
| *B06B 1/04* | (2006.01) |
| *H02K 33/18* | (2006.01) |
| *H02K 33/16* | (2006.01) |
| *H02K 3/47* | (2006.01) |

(52) U.S. Cl.
CPC ............. *B06B 1/045* (2013.01); *H02K 3/47* (2013.01); *H02K 33/16* (2013.01); *H02K 33/18* (2013.01); *H02K 2211/03* (2013.01)

(58) Field of Classification Search
CPC .......... B60B 1/045; H02K 3/47; H02K 33/16; H02K 33/18; H02K 2211/03
USPC .......................................................... 310/25
See application file for complete search history.

(56) References Cited

U.S. PATENT DOCUMENTS

| | | | | |
|---|---|---|---|---|
| 8,816,540 B2* | 8/2014 | Sun | ........................ | H02K 35/02 310/15 |
| 2011/0316361 A1* | 12/2011 | Park | ........................ | H02K 33/16 310/25 |
| 2013/0154403 A1* | 6/2013 | Hong | ...................... | B06B 1/045 310/25 |
| 2014/0232211 A1* | 8/2014 | Katada | .................. | H02K 33/00 310/25 |
| 2014/0270276 A1* | 9/2014 | Iwakura | ................ | H02K 35/06 381/190 |
| 2016/0204685 A1* | 7/2016 | Mori | ...................... | H02K 33/00 310/25 |
| 2016/0254736 A1* | 9/2016 | Jin | ........................ | H02K 33/16 310/25 |

* cited by examiner

*Primary Examiner* — Forrest M Phillips
(74) *Attorney, Agent, or Firm* — Na Xu; IPro, PLLC

(57) ABSTRACT

A vibration motor is provided in the present disclosure. The vibration motor includes a shell providing an accommodating space, and a vibrating system elastically suspended and accommodated in the accommodating space. The vibrating system includes a magnet assembly and a coil assembly arranged opposite to each other. The coil assembly includes a coil unit with a lead wire, and a first circuit board connected to the lead wire. The vibrating system further includes a second circuit board fixed to the shell, and a twist line unit connected between the first circuit board and the second circuit board.

9 Claims, 3 Drawing Sheets

VIBRATION MOTOR

FIELD OF THE DISCLOSURE

The present disclosure generally relates to vibrator technologies, and more particularly, to a vibration motor applicable to a portable electronic device.

BACKGROUND

With development of electronic technologies, portable electronic devices, such as mobile phones, handheld game players, portable multimedia players, or the like, become more and more popular. Portable electronic devices generally include vibration motors for generating vibration feedback, and thus the vibration motors are required to have high performance and long lifespan.

A typical vibration motor includes a coil assembly with one or more coils, and a lead wire of the coil is led out directly from the coil, and is further electrically connected to a printed circuit board. However, during vibration of the vibration motor, the lead wire of the coil may motion in accompany with the coil, and this may cause the lead wire to suffer fracture.

Therefore, it is desired to provide a vibration motor to overcome the aforesaid problems.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiment thereof.

Figure 1:
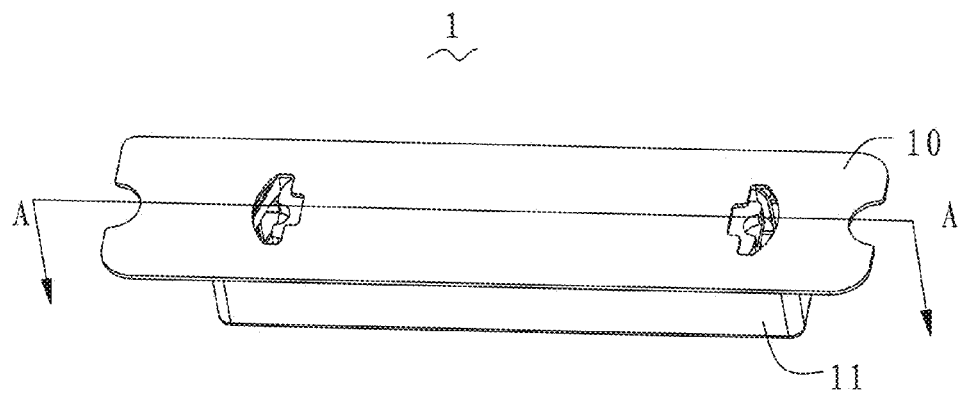
FIG. 1 is a schematic view of a vibration motor according to an embodiment of the present disclosure.
Figure 2:
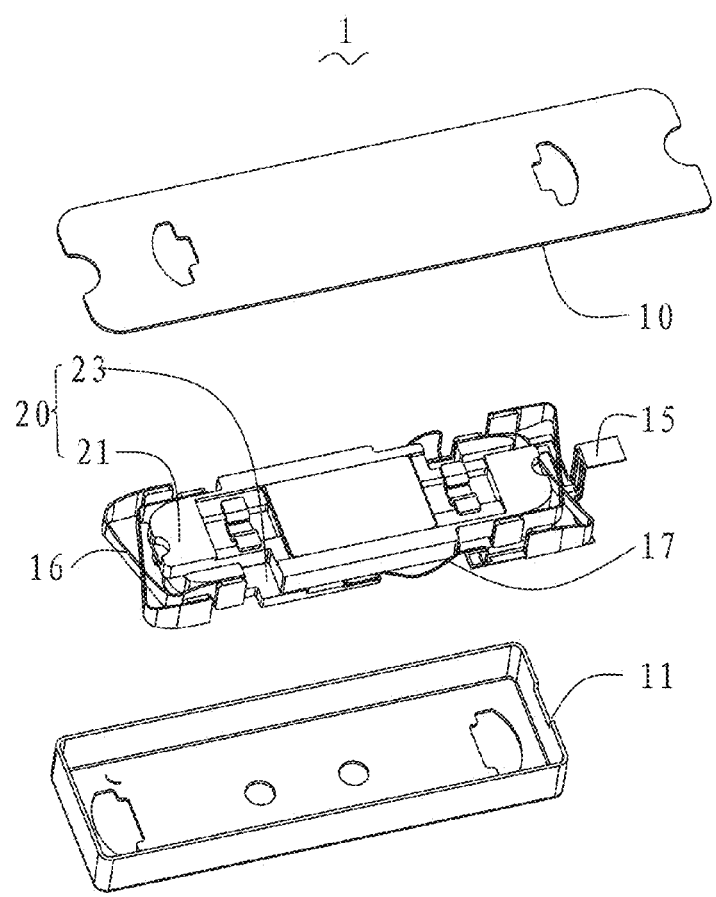
FIG. 2 is an exploded view of the vibration motor of FIG. 1.
Figure 3:
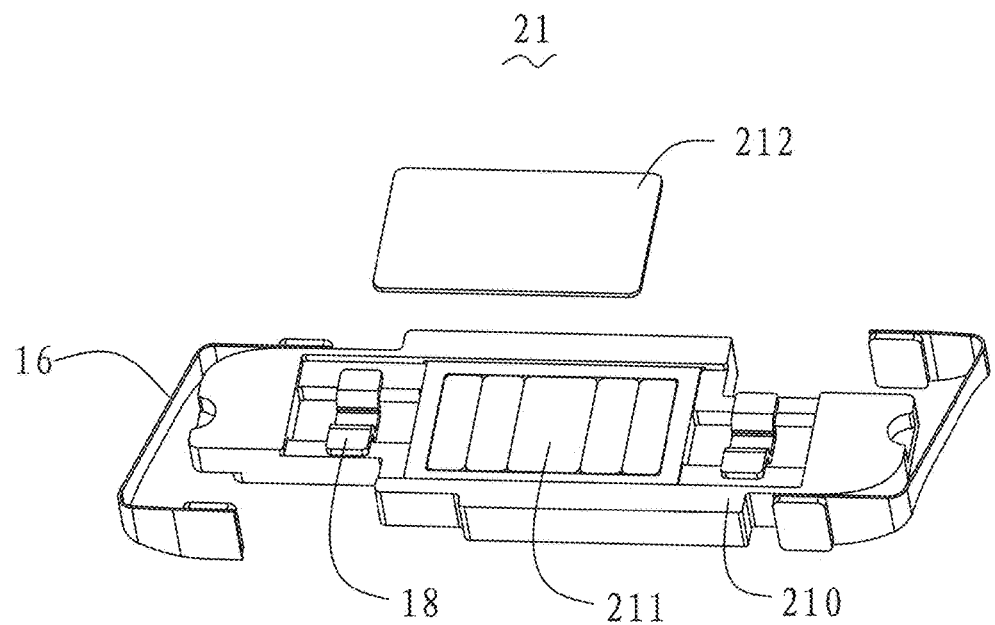
FIG. 3 is a schematic view of a magnet assembly of the vibration motor of FIG. 2.

Referring to FIGS. 1-2, a vibration motor 1 according to an exemplary embodiment of the present disclosure is shown. The vibration motor 1 may be applied in a portable electronic device for providing tactile feedback. The vibration motor 1 includes a shell with a shell body 11 and a cover plate 10; the cover plate 10 covers an opening of the shell body 11 for forming an accommodating space. The vibration motor 1 further includes a vibrating system 20, and a pair of elastic connectors 14 for elastically suspending and supporting the vibrating system 20 in the accommodating space provided by the shell.

The vibrating system 20 includes a magnet assembly 21 and a coil assembly 23 arranged in parallel to the magnet assembly 21. In the present embodiment, the magnet assembly 21 is staked on the coil assembly 23, and is arranged adjacent to and abut against the cover plate 10 of the shell. The coil assembly 23 is arranged adjacent to and abut against a bottom plate of the shell body 11.

Figure 4:
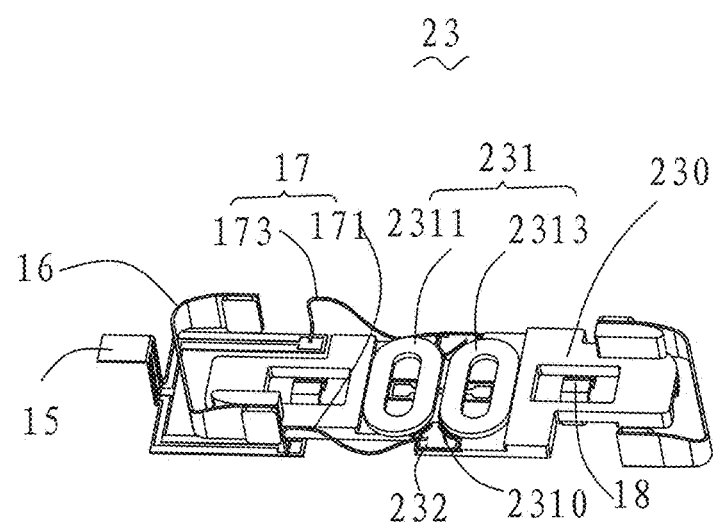
FIG. 4 is a schematic view of a coil assembly of the vibration motor of FIG. 2.
Figure 5:
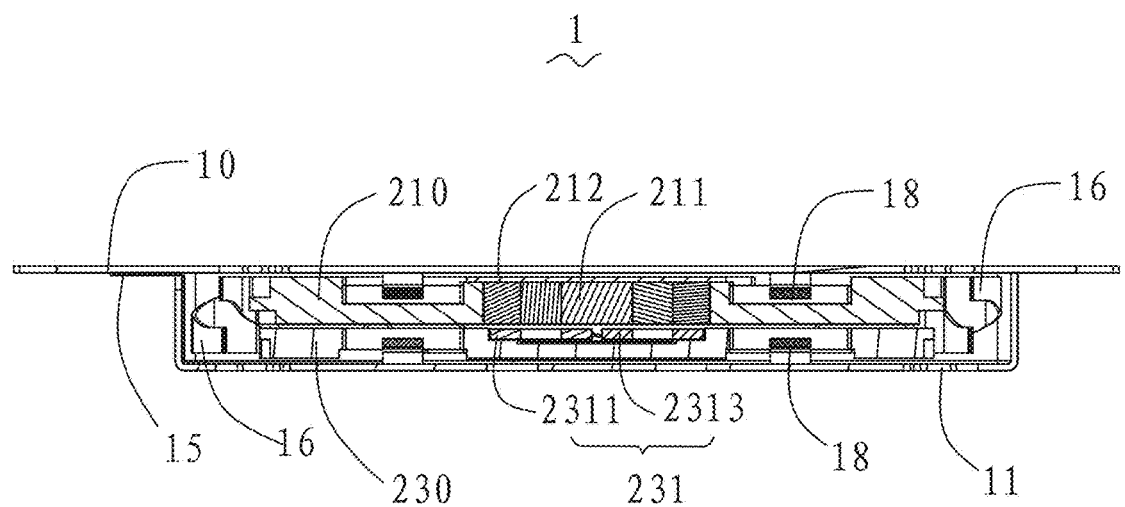
FIG. 5 is a cross-sectional view of the vibration motor of FIG. 1, taken along line A-A.

Referring also to FIG. 4, the coil assembly 23 includes a coil unit 231 and a first circuit board 232. The coil unit 231 includes a pair of lead wire 2310 connected to the first circuit board 232. The vibration motor 1 may further includes a second circuit board 15 for connecting with an external circuit, and a twist wire unit 17 connected between the first circuit board 232 and the second circuit board 15. In particular, the first circuit board 232 and the second circuit board 15 may both be flexible printed circuit boards (FPC). The twist wire unit 17 has a good reliability as being elastic and ductile, and thus the twist wire unit 17 is difficult to suffer fracture during a reciprocating motion of the coil assembly 23.

As illustrated in FIG. 4, the coil assembly 23 may further include a first mass member 230 for fixing the coil unit 231 and the first circuit board 232. The first mass member 230 includes a receiving groove formed in a surface facing the magnet assembly 21 and for receiving and fixing the coil unit 231 and the first circuit board 232. For example, the first circuit board 232 may be disposed on a central groove bottom of the receiving groove; the coil unit 231 is arranged on and covers the first circuit board 232, and two opposite ends of the coil unit 231 are seized up by inner sidewalls of the receiving groove.

In particular, the coil unit 231 may include a first coil 2311 and a second coil 2313 arranged in parallel in the receiving groove. The first circuit board 232 has a cross-shaped profile, and includes a main body parallel to the first coil 2311 and the second coil 2313. The first circuit board 232 further includes two supporting arms perpendicularly extending from the main body to the first coil 2311 and the second coil 2313 respectively. The first coil 2311 and the second coil 2313 are both ring-shaped coil, such as a racetrack-shaped coil, the two supporting arms extend to an inner ring of the first coil 2311 and an inner ring of the second coil 2313 respectively.

Each of the first coil 2311 and the second coil 2313 includes a lead wire 2310; the lead wire 2310 may be connected to a selected one of the main body and a corresponding extending arm. In the present embodiment, the lead wires 2310 of the first coil 2311 and the second coil 2313 (namely, a first lead wire and the second lead wire) are connected to two opposite ends of the main body of the first circuit board 232. Preferably, at least one of the lead wires 2310 of the first coil 2311 and the second coil 2313 has a spiral configuration.

Figure 6:
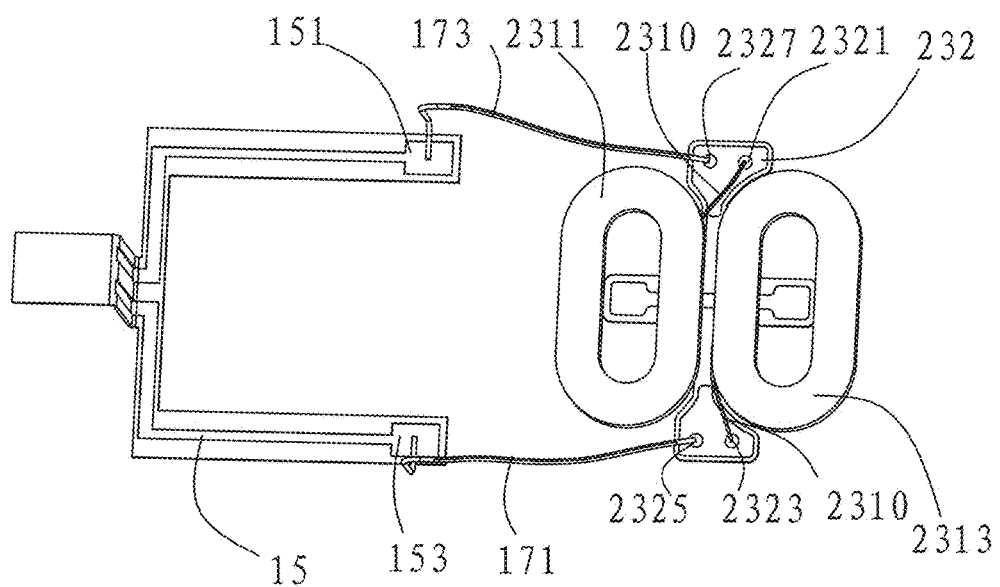
FIG. 6 illustrates a connection relation between a coil unit and a circuit board of the vibration motor of FIG. 1.

Referring also to FIG. 4 and FIG. 6, the twist wire unit 17 includes a first twist wire 171 and a second twist wire 173, each of which corresponds to a respective one of the lead wires 2310 of the first coil 2311 and the second coil 2313. The first circuit board 231 further includes a first connecting spot 2321, a second connecting spot 2323, a third connecting spot 2325 and a fourth connecting spot 2327, all of which may be soldering pads. The first connecting spot 2321 and the fourth connecting spot 2327 are arranged along a vibrating direction of the coil assembly 23 at a side of the coil unit 231; the second connecting spot 2323 and the third connecting spot 2325 are arranged along the vibrating direction of the coil assembly 23 at an opposite side of the coil unit 231. The first connecting spot 2321 is connected to the lead wire 2310 of the first coil 2311, the second connecting spot 2323 is connected to the lead wire 2310 of the second coil 2323, the third connecting spot 2325 is connected to a first end of the first twist wire 171, and the fourth connecting spot 2327 is connected to a first end of the second twist wire 173.

The second circuit board 15 is fixed to the shell body 11, and includes a fifth connecting spot 151 and a sixth connecting spot 153, both of which may also be soldering pads. The fifth connecting spot 151 is connected to a second end of the second twist wire 173, and the sixth connecting spot 153 is connected to a second end of the first twist wire 171.

In other words, two opposite ends of the first twist wire 171 are connected to the third connecting spot 2325 and the sixth connecting spot 153 respectively, and two opposite ends of the second twist wire 173 are connected to the fourth connecting spot 2327 and the fifth connecting spot 151 respectively. The first twist wire 171 and the second twist wire 173 buckle along the vibration direction of the vibrating system 20.

Referring also to FIGS. 2-5, the magnet assembly 21 includes a second mass member 210 opposite to the coil assembly 23, and a magnet 211 received in the second mass member 210. The magnet 211 faces the coil unit 231. Two opposite ends of the second mass member 210 and two opposite ends of the first mass member 230 are elastically suspended in the shell via the pair of elastic connectors 16. Each of the elastic connectors 16 may includes two elastic connecting units, and each of the elastic connecting units may be in a U-shape form including a connecting part and two fixing arms extending perpendicularly from the connecting part. One of the fixing arms is connected to a corresponding one of the first mass member 230 and the second mass member 210, and the other one of the fixing arms is connected to a sidewall of the shell body 11. Moreover, the two U-shaped elastic connecting units of an elastic connector 16 intersect but not interfere with each other, as illustrated in FIG. 2, and moreover, the U-shaped elastic connecting units of the pair of elastic connectors 16 are located in a same plane.

In addition, the second mass member 210 may include a though hole penetrating through a central region thereof, and the magnet 211 is received in the through hole. The magnet assembly 21 further includes a pole plate 212 between the cover plate 10 and the magnet 211, and at least one gasket member 18 between the second mass member 210 and the cover plate 10. The at least one gasket member 18 is provided to protect the magnet assembly 21 from colliding with the cover plate 10. Similarly, other gasket member may also be provided between the first mass member 230 and the bottom plate of the shell body 11 for protecting the coil assembly 23 from colliding with the shell body 11.

In operation, the second circuit board 15 receives electric signals and to enable the coil unit 231 to generate a magnetic field, and further provide a magnetic force interacting with the magnet 211, and thus the magnet assembly 21 and the coil assembly 23 of the vibrating system 20 are driven to perform linear reciprocating vibration. Because the lead wires 2310 of the coil unit 231 is connected to the first circuit board 232, which is connected to the second circuit board 15 via the twist wire unit 17, the twist wire unit 17 may perform necessary deformation to undertakes the vibrating of the vibrating system 20. Therefore, a stress applied to the lead wires 2310 can be depressed, to protect the lead wires 2310 from suffering deformation. As such, a reliability of the vibration motor 1 is improved.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor, comprising:
a shell providing an accommodating space; and
a vibrating system elastically suspended and accommodated in the accommodating space, the vibrating system comprising a magnet assembly and a coil assembly arranged opposite to each other, the magnet assembly driving the coil assembly to vibrate, meanwhile, the coil assembly driving the magnet assembly to vibrate;
wherein the coil assembly comprises a first mass member, a coil unit with a lead wire, and a first circuit board connected to the lead wire; the coil unit and the first circuit board are fixed to the first mass member, the vibration motor further comprises a second circuit board fixed to the shell, and a twist wire unit connected between the first circuit board and the second circuit board.

2. The vibration motor as described in claim 1, wherein the coil unit comprises a first coil and a second coil arranged in parallel on the first mass member.

3. The vibration motor as described in claim 2, wherein the first coil comprises a first lead wire, and the second coil comprises a second lead wire, at least one of the first lead wire and the second lead wire has a spiral configuration.

4. The vibration motor as described in claim 3, wherein the first circuit board comprises a first connecting spot connected to the first lead wire, and a second connecting spot connected to the second lead wire.

5. The vibration motor as described in claim 4, wherein the first circuit board further comprises a third connecting spot and a fourth connecting spot; the twist wire unit comprises a first twist wire connected between the third connecting spot and the second circuit board, and a second twist wire connected between the fourth connecting spot and the second circuit board.

6. The vibration motor as described in claim 5, wherein the first connecting spot and the fourth connecting spot are arranged along a vibrating direction of the coil assembly at a side of the coil unit; the second connecting spot and the third connecting spot are arranged along the vibrating direction of the coil assembly at an opposite side of the coil unit.

7. The vibration motor as described in claim 6, wherein the second circuit board comprises a fifth connecting spot connected to a corresponding end of the second twist wire, and a sixth connecting spot connected to a corresponding end of the firth twist wire.

8. The vibration motor as described in claim 1, wherein the magnet assembly comprises a second mass member opposite to the coil assembly and including a through hole, and a magnet received in the through hole of the second mass member.

9. The vibration motor as described in claim 1, wherein the twist wire unit buckles along a vibration direction of the vibrating system.

* * * * *